Feb. 21, 1967  K. W. TANTLINGER  3,305,110
MATERIAL HANDLING EQUIPMENT
Filed Feb. 16, 1965  3 Sheets-Sheet 2
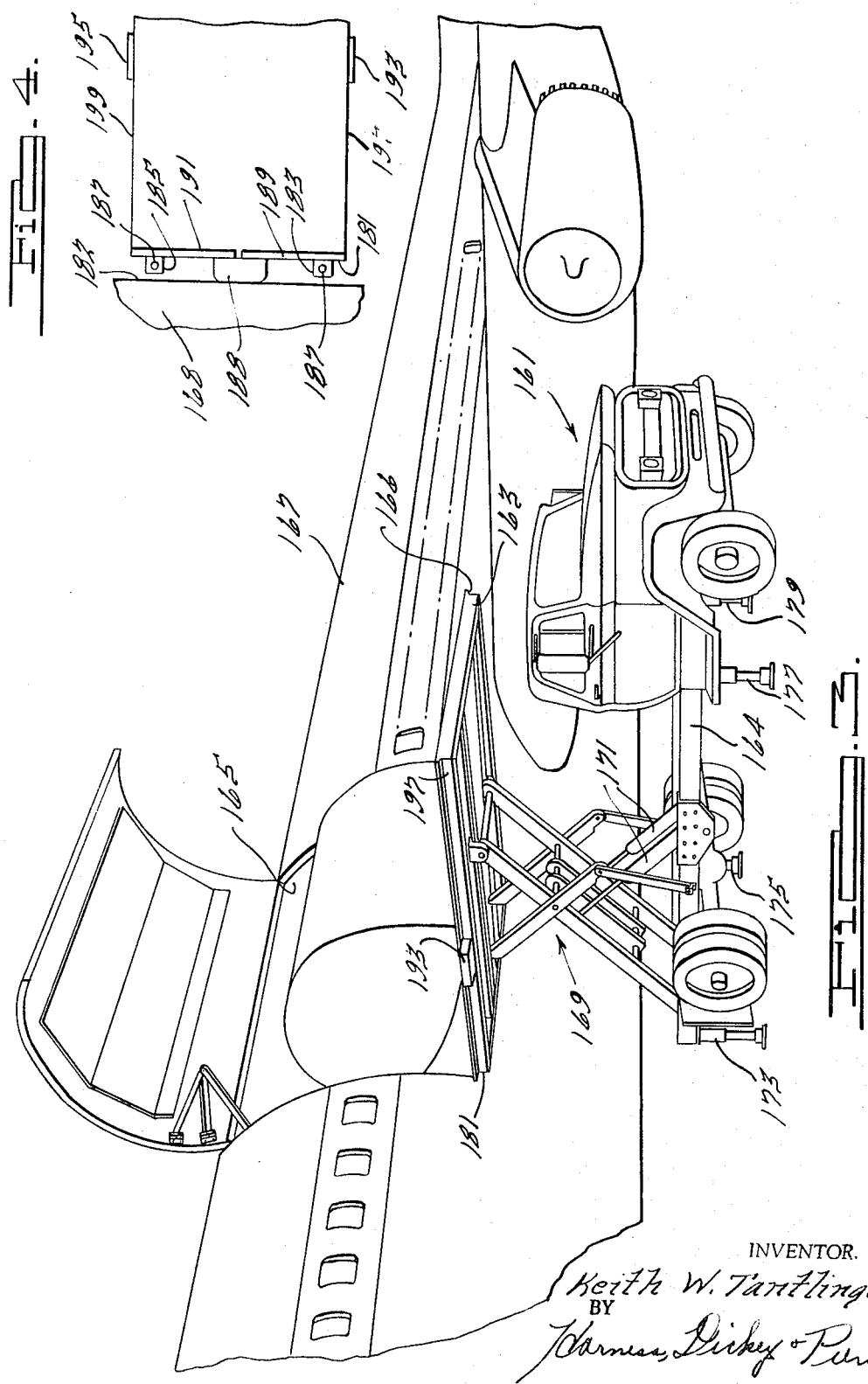
INVENTOR.
Keith W. Tantlinger.
BY
Harness, Dickey & Pierce
ATTORNEYS.

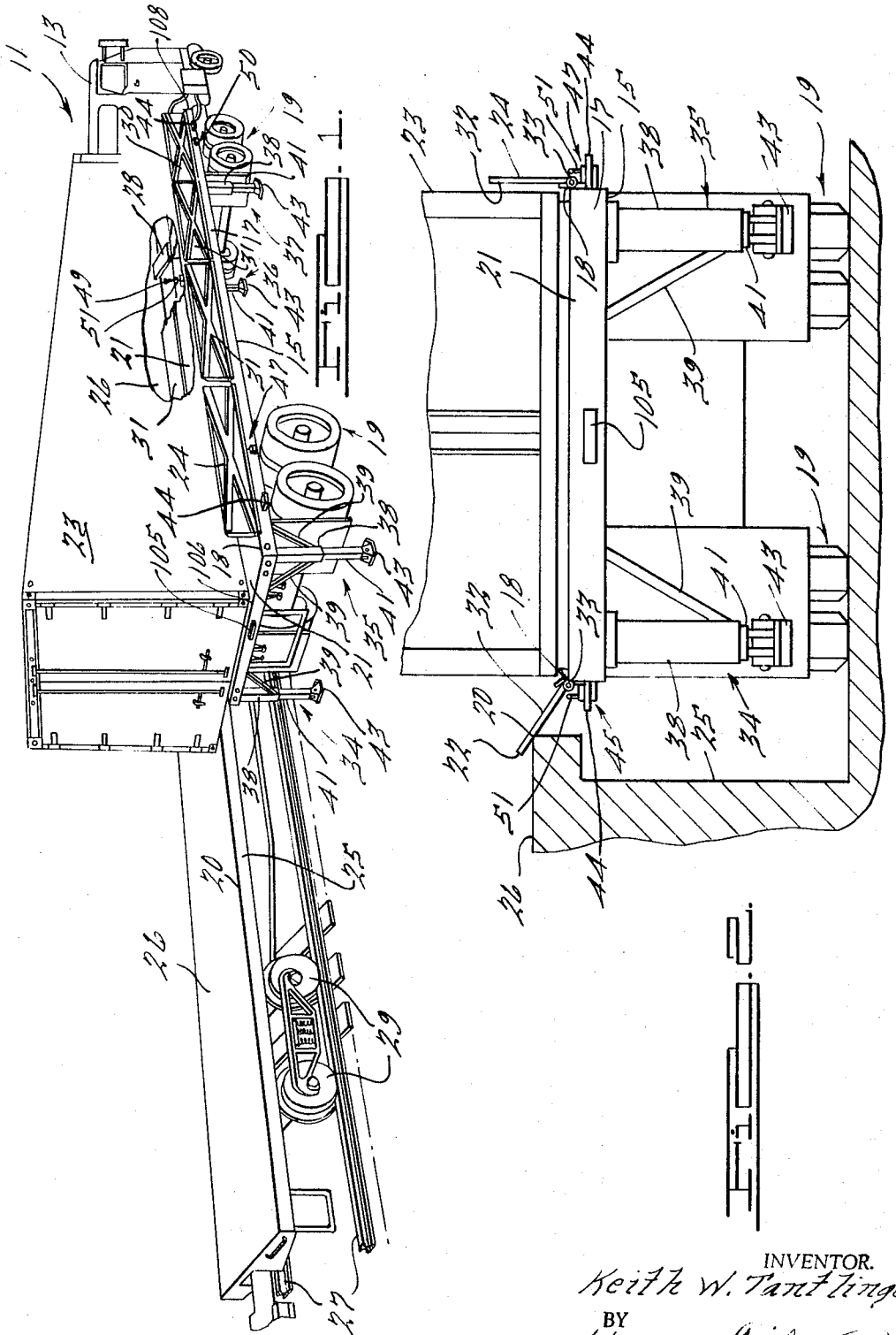

Feb. 21, 1967 K. W. TANTLINGER 3,305,110
MATERIAL HANDLING EQUIPMENT
Filed Feb. 16, 1965 3 Sheets-Sheet 3
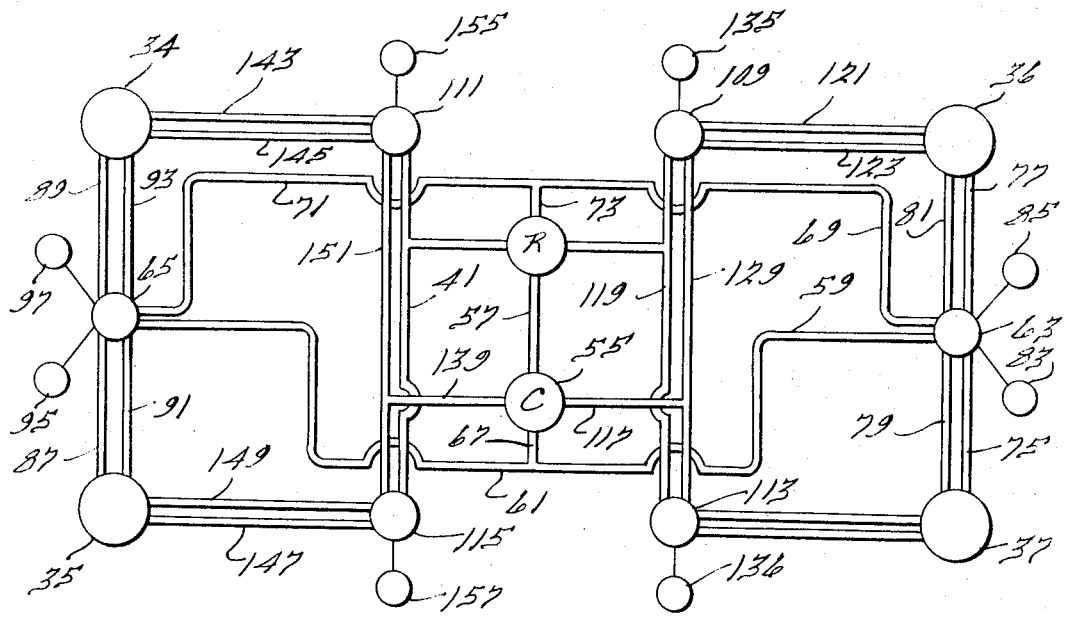
FIG. 5.
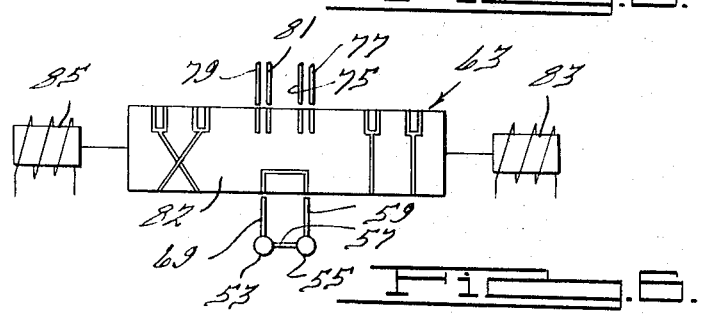
FIG. 6.
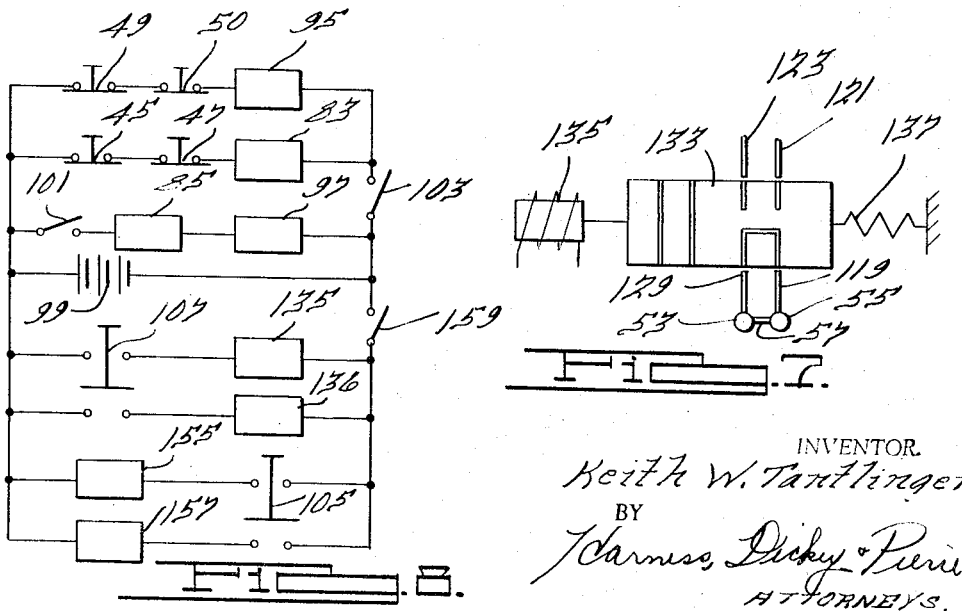
FIG. 7.
FIG. 8.
INVENTOR.
Keith W. Tantlinger
BY
Harness, Dickey & Pierce
ATTORNEYS.

United States Patent Office 3,305,110
Patented Feb. 21, 1967

3,305,110
MATERIAL HANDLING EQUIPMENT
Keith W. Tantlinger, Grosse Pointe Shores, Mich., assignor to Fruehauf Corporation, Detroit, Mich., a corporation of Michigan
Filed Feb. 16, 1965, Ser. No. 433,135
1 Claim. (Cl. 214—38)

This invention relates generally to material handling vehicles, and particularly to an automatic elevating device for the platform of a ground vehicle adapted to position a material supporting surface of the platform so that one edge thereof is coplanar with the edge of a surface adjacent thereto.

In transferring relatively large articles such as, for example, shipping boxes, crates and other containers from one vehicle to another or between a vehicle and a loading dock, it is necessary for easy handling that the adjacent edges of the transferring surfaces of these vehicles or of the vehicle and dock be at substantially the same height and coplanar. This necessity is made even more critical by the recent advent of the air-lift pad system of article transfer. In this system, pressurized air is injected to a cavity beneath the box, crate or other article and is allowed to escape along the bottom thereof. This escaping pressurized air raises the article slightly and forms a thin anti-friction air layer between the container and the surface below upon which the container floats, thereby facilitating easy movement of relatively large and heavy containers. However, in order to adapt this system to transfer articles between two adjacent surfaces, the adjacent edges of the surfaces must be coplanar and, in addition, these entire surfaces must be in substantially the same plane so that the lifting pressure is equal across the article bottom surface and all areas of the article bottom surface are spaced substantially equally from the transferring surfaces.

The problem becomes apparent when considering a transfer of commodities between a large transporting vehicle such as an over-the-road type trailer and a loading dock or rail car where, quite often, the height of the trailer platform surface and that of the dock or rail car platform surface differ. Additionally, the trailer platform surface may be skewed longitudinally or transversely relative to the dock or rail car surface, with any one of the above conditions normally preventing easy transfer of the boxes or crates. Similarly, the relative position of platform or transferring surfaces of aircraft and ground loading vehicles often differs even more widely both in elevation and orientation. Thus, there is a strong felt need for a device adapted to elevate and/or orient the platform of a vehicle to render its side edge at substantially the same height and coplanar with the side edge of an adjacent surface, and in some cases to render the platform surface coplanar with an adjacent surface and permit easy transfer of articles therebetween.

The present invention contemplates solving the aforementioned problem by providing a lift assembly for the platform portion of ground vehicles selectively operable in direct response to existing differences in height and orientation between the side edge of the vehicle platform surface and the side edge of an adjacent surface to elevate and/or orient the vehicle platform and render the adjacent transferring surface edges coplanar. In addition, this lift assembly is selectively operable to render the platform surface transverse edges which are normal to the given edge level.

Briefly, this invention includes a ramp assembly positioned on the vehicle adjacent at least one side edge of a flat supporting platform thereon movable adjacent another vehicle platform or loading dock surface pursuant to transferring boxes, crates or other containers therebetween. The ramp assembly is movable to a position outwardly of the vehicle to rest upon the adjacent surface, and provides a continuous transferring surface upon which the containers can move. An automatic control device motivates one or several of a plurality of lift devices disposed at particular locations around the vehicle in response to the position of the ramp device relative to the vehicle platform by which it is carried when it rests upon the adjacent platform surface. These lift devices elevate and/or orient the vehicle platform until the side edge of the vehicle platform surface is at substantially the same height and coplanar with the side edge of the adjacent surface, at which time the control device terminates their operation. In addition, the present invention may include a control operable in response to the vehicle transverse edges, which are normal to the side edge, being non-level to the lift devices and render and maintain these edges level. The lift devices maintain the vehicle platform in this reoriented position until a control reverses the lift devices and the vehicle platform is returned to its normal position.

The device of the present invention is adaptable for use in conjunction both with vehicles having platforms resiliently suspended thereon, such as, for example, over-the-road trailers supported by resilient suspensions, as well as with vehicles having platforms which can be elevated such as, for example, those used to load aircraft. In the former, the vehicle platforms need only be raised and/or oriented a relatively small amount, since rail cars and loading docks are designed with their loading surfaces generally at the same elevation as the loading surface of over-the-road vehicles. In the latter, the vehicle platform normally is extended or raised to a position adjacent the aircraft cabin platform. With this type of vehicle, the ramps of the present invention are positioned on the cabin surface after the vehicle platform has been extended adjacent the cabin surface, whereupon the platform is oriented as above. In addition, the lift devices for this type of vehicle can derive their power directly from the power system used to raise the platform from the vehicle.

An important object of the present invention, therefore, is a vehicle platform elevating device which is automatically operable in response to the relative positions of the vehicle platform and an adjacent surface to render the adjacent edges of the vehicle surfaces at substantially the same height and coplanar.

A further object of the present invention is a vehicle platform elevating device of the above type which is automatically operable in response to a departure of a pair of platform edges from the horizontal plane to render these edges level.

A further object of the present invention is an elevating and orienting device of the above character adapted for use both on vehicles having an extendible platform and those having a resiliently supported platform.

A further object of the present invention is a leveling device of the above character which is relatively inexpensive to manufacture, rugged in construction and reliable in use.

Further objects of the present invention will become more apparent from a consideration of the following detailed description and claims taken in conjunction with the drawings in which:

FIGURE 1 is a perspective view of a ground vehicle incorporating the device of the present invention;

FIG. 2 is an enlarged and elevational view of the structure of FIG. 1;

FIG. 3 is a view similar to FIG. 1 showing another form of ground vehicle incorporating the principles of the present invention;

FIG. 4 is a plan view of a portion of FIG. 3;

FIG. 5 is a schematic illustration of a typical fluid elevating and orienting system for effecting the principles of the present invention;

FIG. 6 is a schematic illustration of a control valve used in one portion of the fluid system of the present invention;

FIG. 7 is a schematic illustration of a control valve used in another portion of the fluid system of the present invention; and FIG. 8 is a schematic illustration of a typical electrical control circuit for the fluid system of the present invention.

Referring now specifically to the drawings, and particularly FIGS. 1 and 2, a vehicle incorporating the principles of the present invention is illustrated generally at 11 and includes an over-the-road tractor 13 connected to a trailer 15 by a fifth wheel assembly (not shown). The trailer 15 may have a variety of configurations but in the illustrated arrangement it includes a generally horizontally extending elongated platform 17 supported upon spaced ground contacting wheel assemblies 19 by a resilient suspension system (not shown). The platform 17 has an upwardly facing generally flat surface 21 having side edges 18 and upon which the cargo, in this case a crate 23, is supported. As shown, the platform 17 is positionable adjacent another generally horizontally extending platform 25, shown here as being part of a railroad car, having an upwardly facing, generally flat surface 26 and a side edge 20. The railroad car is supported on tracks 27 by wheels 29. It is to be understood that this platform 25, platform surface 26 and side edge 70 may instead be part of a loading dock, as shown in FIG. 2, or it may be part of another over-the-road vehicle.

As perhaps best shown in FIG. 2, the adjacent surface side edges 18 and 20 of the adjacent platforms 17 and 25, respectively, may differ in elevation, and in addition, may be skewed relative to each other. This is often the case since the platform top surface of a rail car at a loading station and the top surface of a loading dock are generally level or lie in a horizontal plane while the ground adjacent the rail car or dock and upon which the ground vehicle rests usually is not. In the case of the two ground vehicles positioned side by side, the adjacent surface side edges thereof may well be at generally the same elevation; however, irregularities in the ground contour often render these edges skewed. Thus, in order that cargo can be easily transferred, for example, from the vehicle platform 17 to the adjacent platform 25, it is necessary that the relative positioning of their adjacent surface side edges 18 and 20 be adjusted to render them at substantially the same height and coplanar.

As shown in FIGS. 1 and 2, a pair of ramps 22 and 24, each having a generally flat surface 32, is pivotally mounted adjacent the rear portion of the vehicle platform 17 at each side edge 18, respectively, by hinges 33. Similarly, an identical pair of ramps 28 and 30 is pivotally mounted adjacent the front portion of the vehicle platform and at each side edge thereof, respectively. Additional ramps 31 are pivotally mounted at each side edge 18 of the vehicle platform 17 between the ramps 22 and 28 and between the ramps 24 and 30.

The ramps 22, 24, 28 and 30 positioned adjacent each corner of the vehicle platform are independently movable and are positioned so that when they are pivoted to a generally horizontal position extending outwardly of the platform 17, the top surfaces 32 of each are generally coplanar with the surface 21. The ramps 22, 24, 28 and 30, and the ramps 31 are preferably movable from a generally vertically extending position shown in FIG. 1 where they act as vehicle side rails, to a position extending outwardly of the platform 17. In the latter position, the ramps 22 and 28, and the intermediate ramps 31, or the ramps 24 and 30 and the intermediate ramps 31 are positioned to rest upon the top surface 26 of an adjacent platform 25 and provide a substantially continuous transferring surface between the adjacent platforms 17 and 25. In addition, the position of the ramps relative to the vehicle platform 17, when the ramps 22 and 28 or 24 and 30 rest upon the adjacent surface 26, controls the operation of lift devices, to be described, which position the adjacent surface side edges 18 and 20 at substantially the same height and coplanar.

According to the principles of the present invention, a plurality of selectively operated platform lift devices 34, 35, 36 and 37 are carried by the vehicle platform 17 adjacent the corners thereof. See FIG. 1. These lift devices each preferably includes a cylinder housing 38 fixed to the underside of the platform 17 and reinforced by truss members 39. A piston 41 is slidably disposed within each of the cylinders 38 and each of the pistons has a flanged base 43 fixed thereto at the lower end thereof. Each of these pistons 41 is individually movable to move the bases 43 from a retracted position spaced from the ground and shown in FIG. 2, to an extended position in contact with the ground and shown in FIG. 1. In the latter position, the flanged base 43 of the particular extended piston engages the ground and raises the corner of the platform 17 adjacent thereto. Thus, by individually controlling the movement of these pistons, the elevation and orientation of the platform surface 21 is accurately adjusted.

Each of the pistons 41 is movable vertically relative to its respective cylinder 37 by pressurized fluid being admitted selectively to the upper and lower ends of these cylinders to pressurize opposite sides of the pistons in the usual manner. Thus, pressurized fluid, which may be either hydraulic or pneumatic, is delivered from a source to the upper ends of selected ones of the cylinders 37 by conduits (shown diagrammatically in FIG. 5) to extend the respective pistons 41 to elevate and/or orient the platform 17. Thereafter, fluid is delivered to the lower ends of the cylinders 37 to retract the pistons 41.

As set forth hereinabove, the ramps 22, 24, 28, 30 and the ramps 31 are individually movable from a generally vertically extending position to an outwardly extending position where they rest upon the surface 26 of the platform 25 adjacent thereto. Thus, depending upon which side of the vehicle platform 17 is adjacent the platform 25, either the ramps 22 and 28, or the ramps 24 and 30, and the intermediate ramps 31 are moved outwardly of the platform to rest upon the adjacent surface 26. When the adjacent side edges 18 and 20 of the surfaces 21 and 26 are at substantially the same height and are coplanar, these ramps assume a particular position relative to the platform 17. However, if the side edge 18 of the platform surface 21 is below and/or skewed with respect to the side edge 20 of the surface 26 adjacent thereto, the position assumed by these ramps 22 and 28 or 24 and 30 when resting upon the surface 26 or the side edge 20 varies accordingly from the particular position described above.

An electrical switch assembly is mounted adjacent each corner of the platform 17 beneath the ramps 22, 24, 28 and 30, respectively, and are protected by bumpers 44 extending outwardly of the platform 17. Three of these switch assemblies are shown at 45, 47 and 50, FIGS. 1 and 2, it being understood that the fourth switch 49, illustrated diagrammatically in FIG. 8, is positioned adjacent the front left corner of the platform 17. Each of these switches has arm 51 adapted to be engaged by an adjacent one of the ramps 22, 24, 28 and 30, respectively, when these ramps are moved to their outwardly extending position. These switches may be of a variety of constructions, but are preferably of the type where the arms 51 are normally biased toward an upward, normally closed position by a resilient means (not shown), and are opened when moved downwardly against their biasing means. Thus, when the ramps 22, 24, 28 or 30 are moved downwardly into engagement with the adjacent arms 51, they are moved against the biasing force to open the associated switches. Movement of these ramps away from the switch arms 51 permits them to reclose under the force of the resilient biasing means.

According to the principles of the present invention, the switches 45, 47, 49 and 50 and the ramps 22, 24, 28 and 30 are each positioned on the vehicle platform 17 so that when the surface edges 18 and 20 are at substantially the same height and are coplanar, the switch arms 51 of the switches 45 and 49 or 47 and 50 are engaged by ramps 22 and 28 or 24 and 30, depending upon which side edge 18 of the platform 17 is adjacent the platform 25, and these switches are opened. However, if this vehicle platform surface side edge 18 or one end thereof is lower than the adjacent surface side edge 20, one or both of the switches 45 and 49 or the switches 47 and 50 remain closed.

The switches 45 and 47 are series connected and are each adapted to control the flow of fluid to the cylinders 38 of the lift devices 34 and 35 positioned at the rear of the platform 17 in a manner such that when these switches are closed, fluid is delivered jointly to the upper ends of the cylinders of the lift devices 34 and 35 and when either of these switches is opened, as by engagement thereof by the ramps 22 or 24, respectively, flow of fluid jointly to the upper end of these cylinders ceases. Similarly, the switches 49 and 50 are series connected and each controls the flow of fluid to the upper end of the cylinders 38 at the front of the platform 17 so that when these switches are closed, fluid flows jointly to the upper ends of both of the cylinders 38 of the lift devices 36 and 37, and when either of these switches is engaged by ramp 28 or 30, respectively, this flow ceases. Thus, in the position illustrated in FIGS. 1 and 2, the ramp 22 and switch 45 control the joint flow of fluid to the lift devices 34 and 35, and the ramp 28 and switch 49 control the joint flow of fluid to the lift devices 36 and 37. If the positioning of the vehicle were such that the platform 17 has its other side edge 18 adjacent the platform side edge 20, the control of fluid flow to these lift devices would be afforded by the ramps 24 and 30 and the switches 47 and 50, respectively.

In the arrangement shown in FIGS. 1 and 2, if both the front and rear portions of the platform surface side edge 18 are positioned lower than the adjacent side edge 20 of the surface 26, the ramps 22 and 28 when resting on the surface side edge 20 remain spaced from the arms 51 of the switches 45 and 49 and fluid is delivered to the upper portions of cylinders 38 of the lift devices 34 and 35, and 36 and 37, respectively. This causes the pistons 41 of each of these lift devices to be extended and the flanged bases 43 to engage the ground and raise the platform 17. When the surface 17 is raised to position the edge 18 at the same height and coplanar with the edge 20, the switch arms 51 of switches 45 and 49 are engaged by the ramps 22 and 28 and the switches open to terminate the flow of fluid to the cylinders 38. If only one end of the platform surface edge 18 is lower than the surface edge 20, or if the difference in elevation between the surface edges 18 and 20 is greater at one end than at the other, then fluid is delivered only to those cylinders 38 adjacent the low end of the platform 17, or more fluid is delivered to those cylinders 38 at the end of the platform where the elevation difference between the surface edges 18 and 20 is greater. The fluid control system is constructed so that when the switches 45 and 49, or 47 and 50 are opened, as above, the pistons 41 remain locked in their extended positions. Thereafter, as desired, the flow of fluid to the cylinders 38 is reversed to retract the pistons 41 and bases 43 and return the platform 17 to its normal position.

A fluid system adapted to accomplish this controlled movement of the piston rods 41 is illustrated schematically in FIG. 5. As shown there, a fluid source or reservoir 53 supplies fluid to a compressor 55 by a conduit 57. A pair of conduits 59 and 61 are each connected to a respective one of a pair of four-way valves 63 and 65, and to the compressor 55 by a conduit 67. Each of the valves 63 and 65 is provided with a conduit 69 and 71, respectively, connected to the reservoir through a conduit 73. Thus, upon actuation of the compressor 55, fluid under pressure is pumped from the reservoir 53 through the conduit 57 and thence through the conduit 67 and the conduits 59 and 61 to the valves 63 and 65, respectively. Fluid is permitted to return to the reservoir 53 from the valves 63 and 65 by way of the conduits 69 and 71, respectively, and the conduit 73.

The four-way valve 63 is connected to the front lift devices 36 and 37 jointly by a pair of inlet conduits 75 and 77, respectively, which are adapted to transmit fluid simultaneously from the valve 63 to the upper portion of the cylinders 38 thereof. A pair of return conduits 79 and 81 jointly interconnect the valve 63 and the lower portion of these cylinders 38. These inlet conduits 75 and 77, and return conduits 79 and 81, are connected to the conduit 59 or the conduit 69, respectively, through manipulation of the valve 63 in a manner to be described. Thus, operation of the valve in one direction results in pressurized fluid being transmitted from the conduit 59 to the conduits 75 and 77 to move the pistons and piston rods 41 of the lift devices 36 and 37 downwardly within the cylinders 38 while fluid is exhausted from the lower portion of these cylinders through the conduits 79 and 81 to the valve 63 and back to the reservoir 53 through conduits 69 and 73. When the valve 63 is operated in the other direction, fluid is transmitted from the conduit 59 to conduits 79 and 81 to raise the pistons and piston rods 41 and fluid is exhausted through conduits 75 and 77, through the valve 63 and to the reservoir 53 through the conduits 69 and 73. In a neutral position, the valve 63 blocks fluid flow through the conduits 75, 77, 79 and 81 thereby holding these pistons and piston rods 41 in a given position and directs fluid flow from conduit 59 to conduit 69 and from the compressor 55 to the reservoir 53.

The valve 63 may be of any one of a number of constructions adapted to control the flow of fluid in a manner as described above, a preferred construction being illustrated schematically in FIG. 6. As shown there, the valve 63 includes an elongated body portion adapted for reciprocation along its length by a pair of oppositely wound solenoids 83 and 85 connected thereto at opposite ends thereof. The valve 63 has three operational positions, viz., a normal neutral position shown in FIG. 6 when neither solenoid 83 or 85 is energized, a power position when solenoid 83 is energized to move the valve body 82 to the left as seen in FIG. 6, and a retract position when solenoid 85 is energized to move the valve body 82 to the right as viewed in the figure. When the valve body 82 is in the neutral position, the flow of fluid from the compressor 55 is directed back to the reservoir 53 while fluid flow within the conduits 75, 77, 79 and 81 is blocked. When the solenoid 83 is energized and the valve body 82 moved to the left, fluid flows from the compressor 55 through conduit 59 to the conduits 75 and 77 with return flow through conduits 79 and 81 to conduit 69 and back to the reservoir 53. When the solenoid 85 is energized, fluid is directed from the compressor 55 through conduit 59 to the conduits 79 and 81 with return flow through conduits 75 and 77 to conduit 69 and back to the reservoir 53. Thus, by selectively controlling the positional location of the valve body 82, the lift devices 36 and 37 are energized to raise the elevation of the front portion of the platform 17 and retain it at a given elevation. Thereafter, by reversing the operation of the valve 63, the front portion of the platform 17 is lowered and returned to its normal position.

The valve 65, to which the conduits 61 and 71 are connected, is identical in construction and operation to the valve 63 and is adapted to control flow of fluid from the compressor 55 to the lift devices 34 and 35 at the rear of the platform 17. Thus, a pair of inlet conduits 87 and 89 similar to conduits 75 and 77 connect the valve 65 to the upper portion of the cylinders 38 and a pair of return conduits 91 and 93 similar to conduits 79 and 81 connect the lower portions of the cylinders 38 to the valve 65. A pair of solenoids 95 and 97 are connected to the valve 63 in the same fashion as the solenoids 83 and 85 are connected to the valve 63 so that by energizing the solenoid 95, fluid is directed from the compressor 55 to the conduit 61, through the valve 65 and to the cylinders 38 of the lift devices 34 and 35 through the conduits 87 and 89 to extend the pistons 41 thereof and elevate the rear portion of the platform 17 accordingly. At this time, fluid returns from the lower portion of these cylinders 38 through the conduits 91 and 93, through the valve 63 and back to the reservoir 53 through the conduit 71. When the solenoid 97 is energized, fluid flows from the compressor 55 through the conduit 61 and to the lower portion of the cylinders 38 through the conduits 91 and 93 while the return flow is effected from the upper portion of the cylinders 38 to the reservoir 53 through conduits 87 and 89 and conduit 71. As was the case with the valve 63, the normal neutral position of the valve 65 blocks the flow of fluid through conduits 87, 89, 91 and 93 and directs flow from the compressor 55 and conduit 61 to conduit 71 and reservoir 53 to hold these pistons 41 at a given elevation.

As was set forth hereinabove, ultimate control of fluid flow to the various lift assemblies 34, 35, 36 and 37 rests with the switch assemblies 45 and 49, or 47 and 50 and the solenoids 83 and 95 are energized to extend the pistons 41 of the lift devices 36 and 37, and 34 and 35 with the base portions 43 thereof engaging the ground and raising the front and rear portions of the platform 17, respectively. When the front portion of the platform surface side edge 18 is at the same elevation as the surface side edge 20 in the arrangement of FIGS. 1 and 2, the ramp 28 engages and opens the switch 49 by engaging the arm 51 thereof whereupon the solenoid 83 is de-energized and the valve 63 moves to its neutral position. Likewise, when the rear portion of the platform surface side edge 18 reaches the same elevation as the surface side edge 20, the ramp 22 opens the switch 41 by engaging the switch arm 51 thereof to de-energize the solenoid 95, whereupon the valve 65 moves to its neutral position. The adjacent edges 18 and 20 of the platform top surface 21 and the surface 26 are at this point at the same elevation and are coplanar and remain so until the solenoids 85 and 97 are energized to reverse the valves 63 and 65 and the flow of fluid to the lift devices 36 and 37, and 34 and 35, respectively, whereupon the platform 17 returns to its normal position.

A schematic illustration of the electrical interconnection of the switches 45, 47, 49 and 50, and the solenoids 83, 85, 95 and 97 is seen in FIG. 8. As shown there, a D.C. source 99 is impressed across the solenoid 83 and the two series connected switches, 49 and 50, which are normally closed. The solenoid 95 and normally closed switches 45 and 47 are also connected in series and are in parallel with the series connected solenoid 83 and switches 49 and 50. The solenoids 85 and 97 and a normally open return switch 101 are in parallel with the solenoid 83 and switches 49 and 50, and with the solenoid 95 and switches 45 and 47. A main switch 103 connects the D.C. source 99 with the above elevating circuits. Thus, when it is desired to raise the platform surface side edge 18 to the elevation of the platform surface side edge 20, the ramps 22 and 28 are lowered to rest upon the surface 26 or its side edge 20 and the switch 103 is closed. If the front and rear portions of the platform surface side edge 18 are at the same elevation as the surface side edge 20, the switches 45 and 49 are opened by engagement of the switch arms 51 by the ramps 22 and 28, respectively, and the valves 63 and 65 remain in their neutral position since the solenoids 83 and 95 are also deenergized. However, if either or both the front and rear portions of the platform surface side edge 18 is lower than the surface side edge 20, respective ones of the switches 45 and/or 49 remain closed. In this case, either the solenoid 83 or the solenoid 95, or both, are energized thereby moving the valves 63 and/or 65 to a position causing the front and/or rear portion of the platform 17 to be elevated as described above. This continues until the front and rear portions of the platform surface side edge 18 are at the same elevation as the adjacent portions of the surface side edge 20, whereupon the switches 45 and 49 are opened by the ramps 22 and 28 and the solenoids 83 and 95 deenergized. The platform 17 remains in this position until, as desired, return switch 101 is closed whereupon the solenoids 85 and 97 are energized and the platform 17 returned to its normal position. In describing the invention thus far, it is assumed that the surface 21 will be oriented relative to the surface 26 to permit easy article transfer therebetween when the side edges 18 and 20 are at the same height and are coplanar. However, this invention further provides an integrated control system for leveling the surface 21 transversely of the side edges 18.

The principles of the present invention contemplate the arrangement described above used either alone or in conjunction with a transverse leveling device for the platform top surface 21. Thus, in localities where the platform 17 need only be elevated and/or oriented along the side edges 18 to align the surfaces 21 and 26 sufficiently to permit article transfer therebetween, only the elevational control system described above is used. However, where the platform top surface 21 must be reoriented transversely relative to the surface 26, such as, for example, where the surface 26 is level with the horizontal but the ground adjacent the surface 26 and upon which the vehicle rests is not, a transverse leveling device, described below, is integrated with the above-describing elevating arrangement.

This transverse leveling device includes switches 105 and 107 positioned adjacent the rear and front transverse edges 106 and 108, respectively, of the platform 17 and substantially centrally thereof so as to be level when these edges are level. Only the switch 105 is shown in FIGS. 1 and 2, the switch 107 being illustrated schematically with the switch 105 in FIG. 8. These switches are preferably of the type which are gravity responsive, such as, for example, mercury switches, and remain deenergized when level but are closed when not level. The switches 105 and 107 are connected in a fluid control circuit adapted to energize the lift devices 34, 35, 36 and 37 in response to a departure of the platform transverse edges 106 and 108 from a level condition and are designed to selectively actuate the lift assemblies 34 and 36, or 35 and 37 to orient and level these edges. When the edges 106 and 108, and, therefore, the switches 105 and 107 reach this level position, the control circuit is de-energized.

An example of a fluid system adapted to achieve these ends is illustrated diagrammatically in FIG. 5 as integrated with the elevating and orienting device described hereinabove. As shown there, compressor 55 is adapted to deliver fluid under pressure to the lift devices 36 and 34 through a pair of valves 109 and 111, and to the lift devices 37 and 35 through a pair of valves 113 and 115, respectively. The valves 109 and 111 are adapted for independent or joint operation to controllably energize the lift devices 36 and 34, selectively, as are the valves 113 and 115 which control the lift devices 37 and 35. Thus, either the front edge 108 of the platform, the rear edge 106, or both, are leveled by selective operation of the valves 109, 111, 113 and 115.

As shown, a conduit 117 is connected to the compressor 55 and to a conduit 119 forming a joint fluid inlet for the valves 109 and 113. The valve 109 is connected to the cylinder 38 of the lift device 36 by a pair of conduits 121 and 123 at the upper and lower portion thereof, respectively. Similarly, a pair of conduits 125 and 127 interconnect the valve 113 and the cylinder 38 of the lift device 37 at the upper and lower portion thereof, respectively. A conduit 129 is connected to each of the valves 109 and 113 and to a conduit 131, thereby forming a fluid return from the valves 109 and 113 to the reservoir 53. Thus, fluid is delivered from the compressor to the conduits 117 and 119, through the valve 109 and to the lift assembly 36 by way of the conduit 121 to extend the piston and piston rod 41 thereof and raise the portion of the platform 17 adjacent thereto while fluid is exhausted from the lower portion of this cylinder 38 through the conduit 123 and back to the reservoir 53 by way of the valve 109 and the conduits 129 and 131. Similarly, fluid is delivered to the lift device 37 from the compressor 55 through the conduits 117, 119, the valve 113 and the conduit 125 to extend the piston 41 thereof and raise the portion of the platform 17 adjacent thereto while fluid is exhausted through the conduit 127, the valve 113 and the conduits 129 and 131 to the reservoir.

The valves 109 and 113 are identical and a preferred construction is illustrated schematically in FIG. 7. As shown there, this valve 109 includes a body member 133 movable longitudinally in one longitudinal direction by energization of a solenoid 135, connected thereto and is normally biased in the opposite direction by a compression return spring 137. Normally, the solenoid 135 is de-energized and the valve 109 permits fluid to flow from the compressor 55 back to the reservoir 53 and blocks fluid flow in the conduits 121 and 123. However, upon energization of the solenoid 135 for the valve 109, the valve body 133 is moved in a direction compressing the spring 137 and fluid is delivered to the lift assembly 36 through the conduit 121 to raise the portion of the platform 17 adjacent thereto. The valve 113 is identical in construction and is energized by a solenoid 136 to control flow of fluid in the conduits 125 and 127 as shown schematically in FIG. 4.

Selective energization of the solenoids 135 and 136 is effected by the switch 107, which, as described above, is mounted adjacent the front edge 108 of the platform 17. This switch 107, and its interrelation with the solenoids 135 and 136, is schematically illustrated in FIG. 8. Thus, the solenoids 135 and 136 are each in series with the D.C. source 99, and are connected in parallel with each other. The switch 107 is preferably adapted to selectively connect the solenoid 135 to the source 99, if the portion of the platform front edge 108 adjacent the lift assembly 36 is lower than the portion of this edge adjacent the lift assembly 37. In this way, the piston 41 of the lift assembly 36 is extended and raises this portion of the platform 17 until front edge 108 of the platform 17 is level. At this time, the switch 107 opens, deenergizing the solenoid 135, whereupon the valve body 133 returns to its normal position blocking flow through the conduits 121 and 123. Similarly, if the portion of the platform front edge 108 adjacent the lift device 37 is lower than the portion of this edge adjacent the lift device 36, the switch 107 connects the solenoid 136 to the source 99, thereby actuating the lift device 37. As above, when the front edge 108 of the platform surface 21 is level, the switch 107 opens deenergizing the solenoid 136 and the body 133 of the valve 113 returns to its normal position.

The valves 111 and 115 which control the flow of fluid to the rear lift devices 34 and 35 are identical to the valves 109 and 113 both in construction and function. Thus, a conduit 139 connects the compressor 55 to a conduit 141 forming the fluid inlet for the valves 111 and 115. The valve 111 is connected to the cylinder 38 of the lift device 34 by a pair of conduits 143 and 145 at the upper and lower portions, respectively. Similarly, the valve 115 is connected to the cylinder 38 of the lift device 35 by a pair of conduits 147 and 149 at the upper and lower portions, respectively. A conduit 151 connects the valves 111 and 115 to a conduit 153, in turn connected to the reservoir 53.

The valves 111 and 115 are, as pointed out above, identical in construction to the valves 109 and 113, this structure being schematically illustrated in FIG. 7.

Solenoids 155 and 157 control operation of these valves 111 and 115 and these solenoids are, in turn, selectively energized by the mercury switch 105 in a manner similar to the energization of the solenoids 135 and 136 by the switch 107 described above in detail. However, since the switch 105 and the lift assemblies 34 and 35 are positioned at the rear edge 106 of the platform 17, their function is to level this rear surface. As seen in FIG. 8, the solenoids 155 and 157 are each arranged in series with the power source 99 and in parallel with each other. The switch 105 selectively connects the solenoid 155 or the solenoid 157 to the power source 99, depending upon which side of the rear edge 106 of the platform 17 is lower.

To activate this leveling device, a normally open main leveling switch 159 is closed. Thereafter, if the rear or front edges 106 or 108, respectively, of the platform top surface 21 are not level, one or both of the switches 105 and 107 is closed, thereby actuating selected ones of the valves 109, 111, 113 and 115. The corresponding pistons 41 of the lift devices 36, 34, 37 and 35 are extended and the platform 17 oriented until the surface edges 106 and 108 are level, whereupon the valves 109, 111, 113 and 115 are deenergized blocking fluid flow through the conduits 121, 123, 125, 127, 143, 145, 147 and 149. The switch 159 may then be opened. Thereafter, to position the side edge 18 of the surface 21 of the same height and coplanar with the side edge 20 of the surface 26, the main switch 103 is closed and the ramps 22 and 28 lowered. As described above, either the valve 63 or 65, or both, is actuated, depending upon which of the switches 45 and 49 remains closed, and the selected ones of the lift devices 34 and 35, and 36 and 37 motivated to orient the platform 17 until the surface edges 18 and 20 are at the same height and are coplanar. Freight is then easily transferable from one of these surfaces to the other. Thereafter, the switch 103 is opened and the return switch 101 closed thereby energizing the solenoids 85 and 97 and returning the pistons 41 to their retracted positions.

The orienting and leveling device of the present invention is illustrated in FIG. 1 as used on an over-the-road type vehicle adapted to transfer and receive freight to and from a railroad car, and in FIG. 2 to and from a dock or other supporting platform. This device, however, is equally usable on a vehicle adapted to transfer freight to and from aircraft.

Thus, a vehicle of this type is shown in FIGS. 3 and 4 at 161 as having a rear frame 164 carrying a vertically extendable platform 163 movable to a position adjacent a freight compartment 165 of an aircraft 167. This platform 163 is movable from a retracted or lowered position to an extended or raised position adjacent the floor 168 of the compartment 165 by a scissor type linkage 169 powered by fluid motors 171. However, as was the case in the vehicle and loading platforms of FIGS. 1 and 2, if the adjacent edges of the transferring surfaces of the platform 163 and the compartment floor 168 are skewed relative to each other, it becomes difficult and even impossible to transfer freight therebetween.

Thus, according to the principles of the present invention, vehicle lift devices illustrated generally at 173, 175, 177 and 179 are carried by the vehicle 161 at spaced locations adjacent the corners thereof. These lift devices are identical in construction and function to the lift devices 34, 35, 36 and 37 described above in that they are selectively motivated to orient the platform 163 and position an edge of this platform at substantially the same height and coplanar with an edge of the compartment floor 168 adjacent thereto. The vehicle platform 163 of FIG. 3 is constructed to have its rear edge 181 positioned adjacent the entrance edge 182 of the compartment floor 168 and it is this edge, therefore, that is to be elevated and/or oriented; however, it is to be understood that a vehicle platform having its side edge positioned adjacent the compartment 165, as in FIGS. 1 and 2, is also contemplated.

Thus, a pair of switches 183 and 185 having arms 187 is carried by the platform 163 adjacent the rear edge 181. These switches 183 and 185 are identical in construction to the switches 45, 47, 49 and 50 described above and are protected by a bumper 188; therefore, a detailed description is omitted here. A pair of ramps 189 and 191 is pivotally mounted on the platform 163 adjacent the rear edge 181 and is movable to rest upon the floor 168 of the compartment 165 and to engage the arms 187 of the switches 183 and 185, respectively. As in the embodiment described above, the ramps 189 and 191 engage the arms 187 and open the switches 183 and 185 when the edge 181 is at the same height and coplanar with the edge of the floor of the compartment 165. However, when the switch 183 remains closed, fluid flows to the lift devices 173 and 177 and raises the side of the vehicle 161 and platform 163 adjacent thereto. Similarly, when the switch 185 is closed, the lift devices 175 and 179 are motivated.

To level the platform 163 transversely of the edge 183, a pair of mercury type switches 193 and 195, similar to the switches 105 and 107 described above, is positioned along the side edges 197 and 199, respectively. Thus, when the side edge 197 is not level, switch 193 causes fluid to flow to either the lift devices 173 and 175, or the lift devices 177 and 179. Similarly, the switch 195 controls the flow of fluid to the lift devices 173 and 175, and 177 and 179. Since the construction of these switches, and the details of the circuitry for this modification are substantially the same as that described above, a detailed description is omitted here.

The present invention provides a relatively simple but efficient orienting and leveling device for platform type vehicles which is accurately responsive to differences in elevation and orientation between the surface of the vehicle platform and an adjacent surface to render the surfaces coplanar and facilitate easy freight transfer therebetween. In addition, this device may have integrated therewith an automatic device for leveling the vehicle platform transversely responsive directly to a departure of the platform surface from the horizontal.

While preferred embodiments of the present invention have been illustrated and described in detail above, various additions, substitutions, modifications and omissions may be made thereto without departing from the spirit of the invention as encompassed in the appended claim.

What is claimed is:

In a ground vehicle of the type having a flat generally rectangular elongated platform movably supported thereon, a device for orienting said platform into coplanar relationship with a second platform comprising a plurality of lift devices mounted on said vehicle platform one adjacent each corner thereof, each of said lift devices having a portion movable from a retracted position spaced from the ground to an extended position engaging the ground to elevate the portion of the platform adjacent thereto, power means adapted to motivate selected ones of said lift device movable portions, first switch means including a pair of switches disposed on said platform along opposite edges thereof and each adapted when closed to cause said power means to move a selected one of said lift device movable portions toward its extended positions, said first switch means being responsive to the orientation of said vehicle platform about a first axis whereby to open when the platform top surface adjacent thereto is level with said second platform, second switch means including a pair of switches disposed along opposite edges of said vehicle platform between said first-mentioned edges, each of said last-mentioned switches being operatively connected to said lift devices to selectively control energization thereof, and ramp means pivotally carried by said platform adjacent each of said last-mentioned switches and movable independently to overlie the surface of said second platform and positioned to engage and open each of said switches when said platforms are in coplanar relationship.

References Cited by the Examiner
UNITED STATES PATENTS

| | | | |
|---|---|---|---|
| 1,279,967 | 9/1918 | Barlow. | |
| 2,489,869 | 11/1949 | Dunn | 214—38 |
| 2,798,620 | 7/1957 | Allan | 214—38 |
| 2,831,588 | 4/1958 | Seed. | |
| 3,220,698 | 11/1965 | Carder | 214—512 |

GERALD M. FORLENZA, *Primary Examiner.*